W. S. HUNTINGTON.
Plow-Cleaner.
No. 61,203.
Patented Jan. 15, 1867.
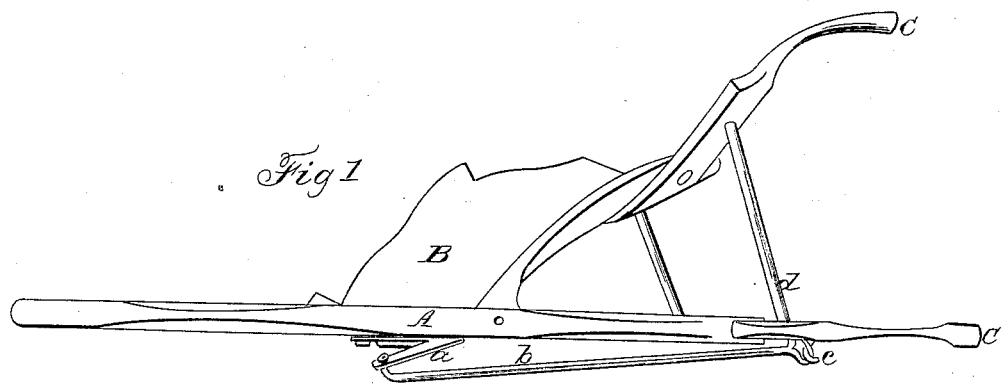
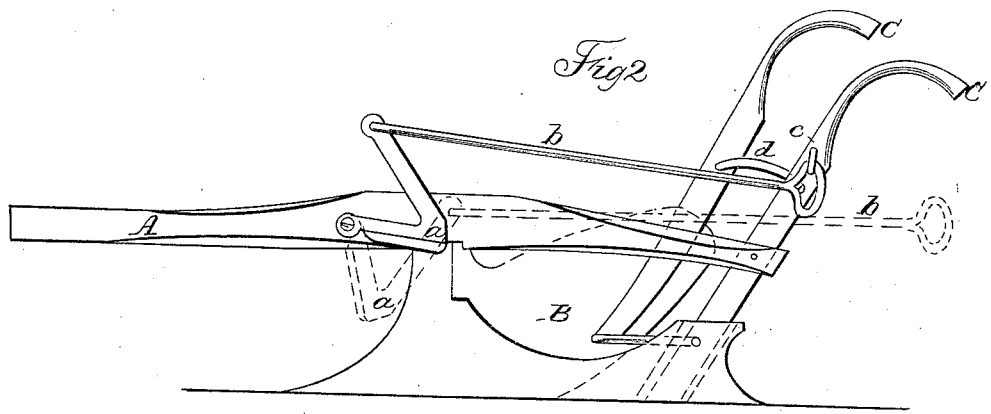

United States Patent Office.

WILLIAM S. HUNTINGTON, OF BYRON, ASSIGNOR TO HIMSELF AND C. P. DEVEREAUX, OF NORTH NEWBURGH, MICHIGAN.

Letters Patent No. 61,203, dated January 15, 1867.

IMPROVEMENT IN PLOUGHS.

The Schedule referred to in these Letters Patent and making part of the same.

TO ALL WHOM IT MAY CONCERN:

Be it known that I, WILLIAM S. HUNTINGTON, of Byron, in the county of Shiawassee, and State of Michigan, have invented a new and useful Improvement in Ploughs; and I do hereby declare that the following is a full, clear, and exact description thereof, which will enable others skilled in the art to make and use the same, reference being had to the accompanying drawings, forming part of this specification, in which—

Figure 1 is a top view of a plough having my improved grass and weed-cleaning apparatus attached.

Figure 2 is a view of the same on the land side.

Similar letters of reference indicate like parts.

This invention relates to an improved device to be attached to a plough for the purpose of preventing it from choking and clogging by the accumulation of weeds, grass, stubble, &c., in front of the mould-board under the beam, which occasions great trouble and loss of time to the ploughman when ploughing in foul land, and makes bad work by interfering with the free turning of the furrow. It is very simple, and easily managed by the ploughman, by merely pulling a rod connecting the device with the handle of the plough. On the land side of the beam A, just forward of the breast or neck of the mould-board B, is pivoted at one end an elbow scraper, $a$, made of either wrought or cast iron, and at the other end it is connected with a rod, $b$, which runs back and catches at the end on a hook, $c$, on one of the handles, C, or upon the upper round, $d$, between the handles of the plough. The iron elbow scraper, $a$, is so formed and suspended that when the rod $b$ is at rest on the handles, the lower arm is raised out of the way, as seen in fig. 2, and when the rod $b$ is drawn back, the lower arm of the elbow descends with a forward motion, and scrapes the land side of the mould-board, which movement pushes off whatever grass or trash may have lodged against the neck of the plough, and cleans it entirely, as indicated in red in the same figure.

Having described my improvement and its operation, I claim as new, and desire to secure by Letters Patent—

The iron elbow scraper $a$, suspended to the beam A of a plough, in combination with the drawing-rod $b$, arranged and operating substantially as and for the purpose herein described.

WM. S. HUNTINGTON.

Witnesses:
   J. L. SIMONSON,
   J. P. ROGERS.